United States Patent [19]

Godwin, Jr. et al.

[11] Patent Number: 4,494,712
[45] Date of Patent: Jan. 22, 1985

[54] TAPE DECK WITH NON-CONTACTING UNIDIRECTIONAL ROTATION SENSOR CONFIGURED TO PREVENT CAPSTAN TAPE WINDUP

[75] Inventors: Paul K. Godwin, Jr., Farmington; Howard A. Kell, Jr., Farmington Hills, both of Mich.

[73] Assignee: Ford Motor Company, Dearborn, Mich.

[21] Appl. No.: 444,398

[22] PCT Filed: Sep. 30, 1982

[86] PCT No.: PCT/US82/01368
§ 371 Date: Sep. 30, 1982
§ 102(e) Date: Sep. 30, 1982

[51] Int. Cl.³ .................. G03B 1/02; G11B 15/32; G11B 15/43
[52] U.S. Cl. .................. 242/191; 242/210; 360/71; 360/74.2
[58] Field of Search .............. 242/191, 186, 199-204, 242/206, 208-210; 360/71, 73, 74.1, 74.2, 90, 93, 96.3; 340/675

[56] References Cited

U.S. PATENT DOCUMENTS

| | | | |
|---|---|---|---|
| 3,433,428 | 3/1969 | Schatteman | 242/55.13 |
| 3,488,017 | 1/1970 | Schatteman | 242/191 |
| 3,932,890 | 1/1976 | Ueki et al. | 360/75 |
| 3,977,623 | 8/1976 | Bagby et al. | 242/191 |
| 4,234,139 | 1/1980 | Porchia | 242/191 |
| 4,348,702 | 9/1982 | Taraborrelli | 360/71 |

FOREIGN PATENT DOCUMENTS

| | | |
|---|---|---|
| 52-35604 | 3/1977 | Japan . |
| 52-35607 | 3/1977 | Japan . |
| 55-1661 | 8/1980 | Japan . |

Primary Examiner—John M. Jillions
Attorney, Agent, or Firm—Paul K. Godwin, Jr.; Robert D. Sanborn

[57] ABSTRACT

A tape deck, which incorporates a non-contacting take-up reel rotation sensing means and associated sensing circuit for enabling the capstan and take-up reel drive mechanism, includes a magnet which only rotates with the take-up reel when it is driven in the take-up direction. If the take-up reel changes direction, due to tape windup on the capstan, the magnet stops and the sensing circuit disables the drive mechanism to prevent excessive tape windup on the capstan.

6 Claims, 7 Drawing Figures

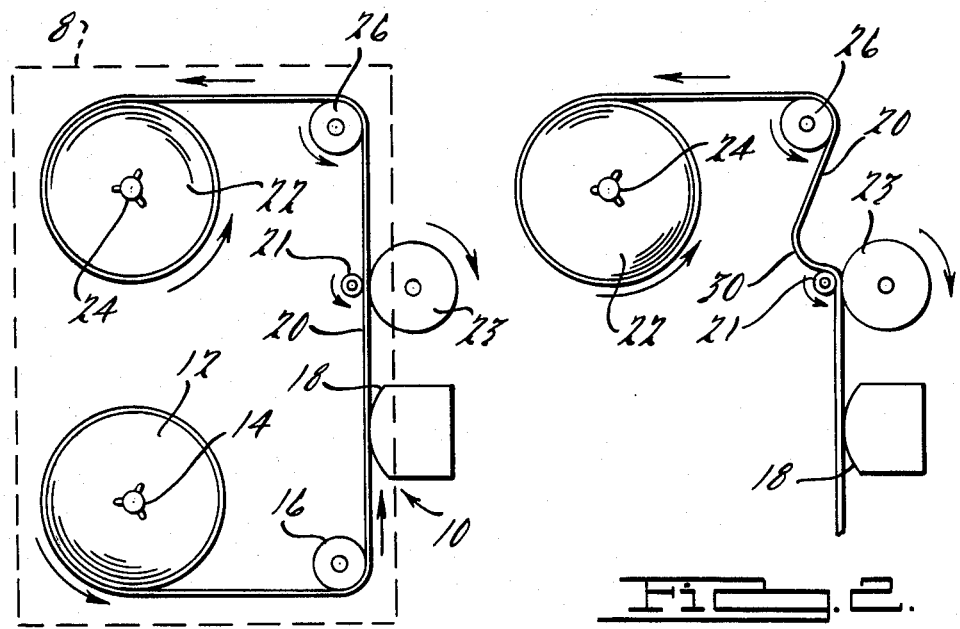
Fig. 1.
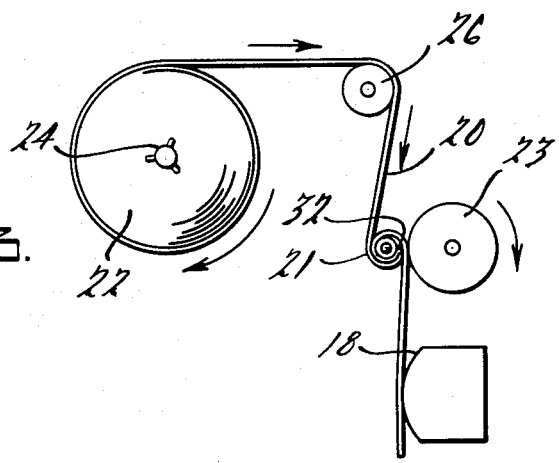
Fig. 2.
Fig. 3.
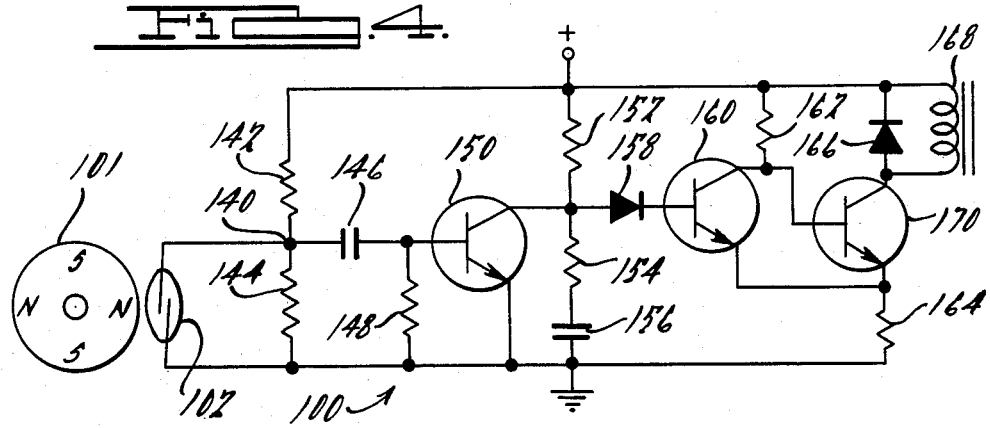
Fig. 4.

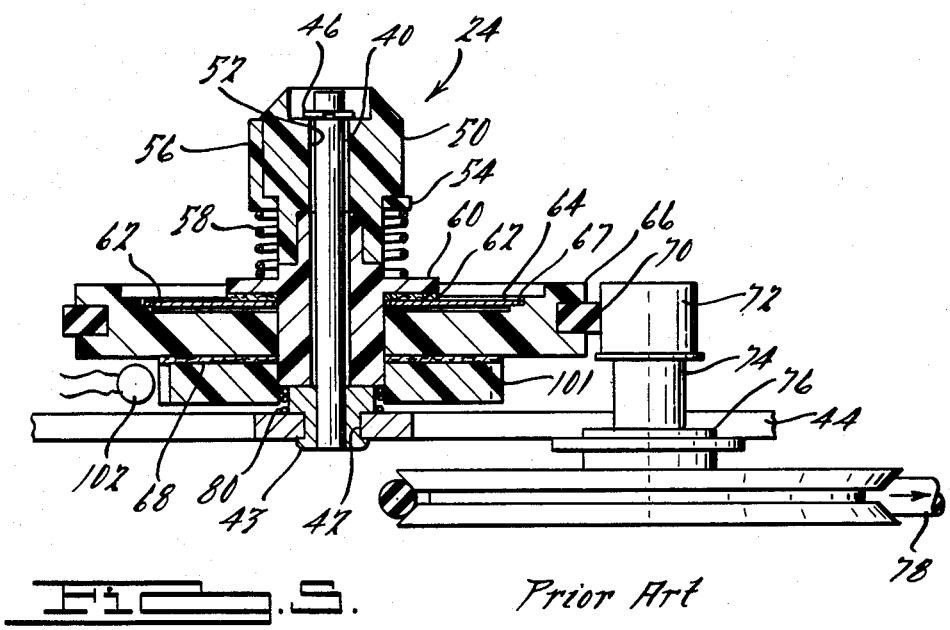
FIG. 5. Prior Art
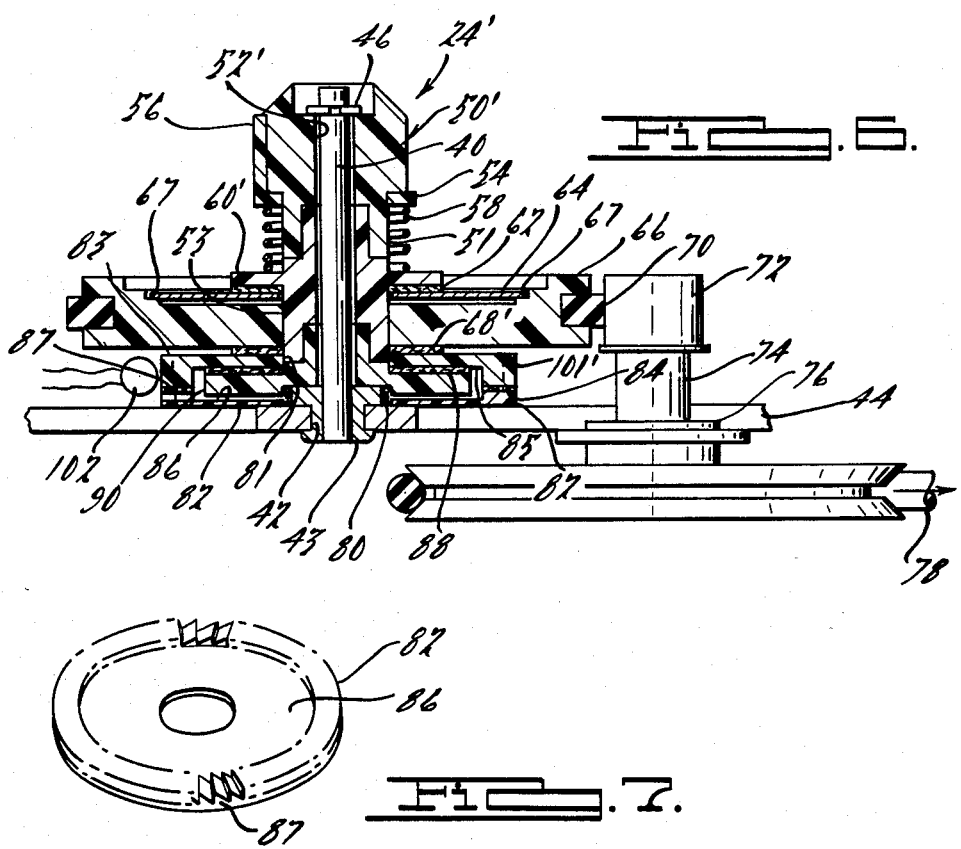
FIG. 6.
FIG. 7.

TAPE DECK WITH NON-CONTACTING UNIDIRECTIONAL ROTATION SENSOR CONFIGURED TO PREVENT CAPSTAN TAPE WINDUP

TECHNICAL FIELD

The present invention is directed to the field of web transport mechanisms and more particularly to magnetic tape decks and improvements therein.

BACKGROUND ART

Reel-to-reel type tape transport mechanisms, especially those which utilize tape cassettes, are subject to tape fouling. One of the causes of tape fouling, occurs when the tape drive mechanism is initially engaged with the tape and reels. The rotationally driven capstan engages the tape between itself and a biased pinch roller and pulls the tape across the tape head. A take-up reel is also rotationally driven, through a slip clutch, to take-up the slack in the tape after it passes from the capstan. However, at the instant of initial start-up, a loop sometimes develops between the capstan and the take-up reel before the take-up reel has had a chance to remove all the slack in the tape. Depending upon the slackness of the tape, and the lightness of the tape, the loop sometimes has sufficient inertia to instantaneously wrap around the capstan, become caught between the incoming tape and the capstan, and be wound thereon. When this capstan windup occurs, the slip clutch driven take-up reel instantaneously reverses its direction of rotation, due to the tape being drawn therefrom and wound onto the capstan. The windup continues until it is either audibly detected and stopped by the operator or binds up the capstan/pinch roller mechanism.

When detected and stopped, the tape must be carefully unwound from the capstan by hand. However, in some cases, the woundup tape is folded and wrinkled so badly that it must be discarded.

Other causes of loops and potential capstan tape windup have been found to be due to: faulty bearings in the deck take-up reel spindle, causing drag; cassettes that have excessive drag on the take-up reel; tape contaminated with materials such as coffee, jelly and oil; tape formed of very lightweight material; and worn or faulty deck braking mechanisms which fail to maintain a tight take-up reel when the decks are switched between the various drive speeds such as fast forward, forward and fast reverse.

Of course, all the problems involving capstan tape windup and discussed herein equally apply to tape windup that may occur on the pinch roller.

It some cassette tape decks, such as those installed on automotive vehicles the cassettes are inserted through an apertured panel and automatically engaged by the tape deck mechanism for playback. When the tape fully unwinds from its supply reel, except for its attached end, onto the take-up reel, the take-up reel stops rotating. A motion/stop sensing mechanism and circuit causes the tape reel drive mechanism to stop and eject the cassette or reverse the play direction, depending upon the unit.

Except for U.S. Pat. No. 4,348,702, the state of the art motion/stop sensing mechanisms do not distinguish between the proper rotational direction accompanying normal operation and the reverse rotational direction of the take-up reel caused by capstan windup.

The aforementioned patent discloses an embodiment having a set of rotational contacts mounted beneath a tape-up reel spindle platform so as to rotate with the platform and provide an electrical discharge path for a circuit connected to a series of printed circuit board contacts beneath the platform. The set of rotational contacts and take-up reel spindle platform are configured so that a one-way clutch is defined between the contacts and the platform whereby the contacts are only rotated when the platform is rotated in the normal, take-up direction.

DISCLOSURE OF THE INVENTION

The present invention incorporates a non-contacting unidirectional reel rotation sensor that provides motion sensing indications to a corresponding circuit when the mechanism is properly operating and provides no indication to that circuit when the take-up reel is caused to stop or rotate in a reverse direction.

The invention is embodied as a modification to a prior art non-contacting motion sensing means and a modification of the mounting of the activating portion thereof with respect to the take-up reel spindle. The unidirectional non-contacting motion sensing means is configured and mounted so as to rotate only in one direction with the properly driven take-up reel spindle and to remain motionless when the spindle is rotated in an opposite direction.

It is, therefore, an object of the present invention to provide a device which senses capstan tape windup and which immediately disables the engagement of the capstan against the pinch roller.

It is another object of the present invention to provide a device which prevents excessive tape fouling by distinguishing between take-up reel motion in a first direction caused by a conventional drive mechanism and reverse take-up reel motion caused by tape windup on the capstan.

It is a further object of the present invention to provide a non-contacting motion sensing switch mounted in conjunction with the take-up reel spindle for rotation in a single direction with the platform in its normal takeup direction and for remaining motionless when the platform is rotated in a reverse direction.

A better understanding of the invention will be obtained by reference to the accompanying drawings and detailed description.

BRIEF DESCRIPTION OF THE DRAWINGS

FIG. 1 is a plan view of a typical reel-to-reel type tape deck under normal operating conditions.

FIG. 2 illustrates a portion of a conventional reel-to-reel cassette tape deck developing a slack tape loop adjacent the capstan.

FIG. 3 illustrates a portion of a conventional reel-to-reel cassette tape deck when the slack tape loop has wrapped around the capstan and is caught between the incoming tape and the capstan.

FIG. 4 is a schematic of a conventional motion sensing circuit which enables a relay connected to a motor for driving the takeup reel and capstan.

FIG. 5 is a cross-sectional view of a prior art take-up reel spindle and a rigidly mounted magnet portion of a non-contacting rotation sensing switch means.

FIG. 6 is a cross-sectional view of a take-up reel spindle embodying the present invention.

FIG. 7 is a perspective view of a one-way clutch component utilized in the embodiment of the present invention shown in FIG. 6.

BEST MODE FOR CARRYING OUT THE INVENTION

FIGS. 1-5 are utilized to illustrate a conventional reel-to-reel type tape deck, its relevant components and the inherent problems.

FIGS. 6 and 7 illustrate the present invention which may be incorporated onto a conventional tape deck, of the type shown in FIGS. 1-5, without disturbing the major components thereof and eliminating the problems of the conventional type deck.

In FIG. 1, the tape deck 10 is shown as comprising a supply reel spindle 14 extending upwards from the support platform (not shown), an alignment roller 16, a playback head 18, a capstan 21, a pinch roller 23, an alignment roller 26 and a take-up reel spindle 24 extending upwards from the support platform. Magnetic tape 20 is shown within a cassette 8 as extending from a supply reel 12 to a take-up reel 22. The tape 20 is threaded around the alignment roller 16, across the head 18, between the capstan 21 and the pinch roller 23 and around alignment roller 26. The supply reel 12 is shown as being centered on and held by the supply spindle 14. Similarly, the take-up reel 22 is shown as centered on and held by the take-up reel spindle 24. In playback or record operations, the take-up reel is driven in a counterclockwise direction to take up slack in the tape which occurs between the capstan and the take-up reel. The take-up spindle 24 is driven through a slip-clutch 62 (FIG. 5) so that excessive tension will not occur on the tape 20. The pinch roller 23 is spring biased to compress the tape 20 against the rotating capstan 21 and the tape 20 is pulled across the head 18.

FIG. 2 effectively illustrates a phenomena which may occur when the pinch roller 23 initially engages the tape 20 against the capstan 21 and commences to pull the tape 20 across the head 18. Often, a loop 30 develops in the tape 20 following the capstan 21. This generally occurs at start-up and before the take-up reel 22 has had a chance to remove all the slack between the capstan and the take-up reel. Of course, when the take-up reel rotates sufficiently, the loop 30 is removed and the tape 20, following the capstan 21, becomes resonably taut.

In some instances, such as when the tape 20 is very thin, or for any of the other reasons that cause the tape to be attracted to the capstan 21, the loop 30 may have sufficient inertia to be carried in a counterclockwise direction with the rotating surface of the capstan 21 and be caught by the incoming tape. This phenomena is illustrated in FIG. 3. When this occurs in conventional tape decks, the tape commences to rapidly windup on the capstan 21. The tape is continued to be drawn across the head 18 and should eventually be audibly noticed by the operator, since it increases the speed of the tape across the head 18 and distorts the program. However, before it is audibly detected, the windup may be so severe that the deck will have to be disassembled in order to remove the tape from the capstan. Of course when capstan windup occurs, the tape 20 between the capstan 21 and the take-up reel 22 is drawn backwards towards the capstan, causing the take-up reel 22 and the take-up reel spindle 24 to be reversibly rotated against the slip clutch drive.

FIG. 4 illustrates a conventional motion sensor circuit 100. The motion sensing circuit 100 is connected to a non-contacting rotary switch, which, in this case, comprises a rotating magnet 101, mounted on the take-up reel spindle 24, and to a tape drive holding relay 168. The motion sensing circuit 100, shown in FIG. 4, contains a capacitor 146 that is charged to a level established by a voltage divider including a resistor 142 and a resistor 144 connected between a 12 volt power source and ground. The rotation of the magnet 101 interacts with an adjacently positioned reed switch 102 to thereby open and close the reed switch 102. The reed switch 102 is connected between capacitor 146 and ground and causes capacitor 146 to be periodically discharged to ground as the magnet 101 rotates. When the magnet 101 is rotating, the transistor 150 is pulse biased on and thereby periodically provides a low impedance path between ground and the junction of resistors 152 and 154. Resistors 152 and 154 are connected in series between the voltage source and a charging capacitor 156. The other side of the charging capacitor 156 is connected to ground. Transistor 160 is biased in a non-conducting condition, when the magnet 101 is rotating and periodically causing transistor 150 to be biased on. Transistor 160 remains off as long as capacitor 156 is not permitted to charge to a predetermined level. While transistor 160 remains off, transistor 170 is biased on and completes a low impedance path to ground through resistor 164 to activate a holding relay 168. The activation of holding relay 168 latches the tape deck drive mechanism.

During the time that transistor 150 is biased on, capacitor 156 is prevent from charging to a potential sufficient to turn on transistor 160. Transistor 160 controls the conductivity of the third transistor 170 such that the conductive states of these two transistors are complementary. Thus, while the take-up reel rotates, transistor 160 is off and transistor 170 is on. However, when the tape becomes completely wound up on the take-up reel, the magnet 101 will cease movement and be stationary along with the take-up reel spindle 24. At that time, transistor 150 will become biased off and capacitor 156 will charge sufficiently to turn on transistor 160, thus biasing transistor 170 off and thereby deactivating holding relay 168. The deactivation of holding relay 168 functions to either release the mechanical cassette retaining element and driving mechanism; to actuate a reverse play mechanism; or to rewind the tape, depending upon the particular tape deck configuration. By appropriate selection of capacitor 156 and resistor 154, the charging time can be selected so that the circuit is more or less responsive to a termination of rotation of the take-up reels.

As an alternative to rotation sensing portion of the circuit 100, the reed switch 102 could be replaced by any other compatible magnetic field sensor switches such as Hall effect or Wiegand effect sensors. In addition, the holding relay 168 could be eliminated and the transistor could be connected directly to the drive motor, as engineering considerations require.

FIG. 5 is a cross-sectional view of a conventional take-up reel spindle 24 mounted for rotation about a rigid pin 40, mounted within an aperture 42 on a mounting platform 44. A bushing 43 is formed in the aperture 42 to secure the pin 40 in place. The spindle 24 comprises a two-piece spindle body 50 having upper and lower portions press-fitted together to form an integral body. The spindle body 50 has a central aperture 52 extending along its height in order to accomodate the pin 40 and to rotate freely thereabout. The upper portion of the spindle body 50 is circularly shaped so as to accomodate the take-up reel and contains a spring mounted reel lock 54 containing a plurality (3) of vertical keys 56 which mate with an equal number of keyways on the spindle body 50 and the tape reel. A spring 58 mounts beneath the reel lock 54 and applies vertical upward biasing thereto so that when the tape reel is placed on the spindle that placement will not be blocked by the vertical keys. The spindle body 50 includes a drive flange 60 extending outward therefrom to provide a biasing reference for the spring 58 on its upper surface and a clutch contact face on its lower surface. A non-woven fiber (felt) clutch pad 62 is located below the drive flange 60 and is held in a compressive state thereagainst by a flat spring washer 64. The spring washer 64 is mounted within a drive wheel 66 and has its outer edges tension adjusted against ramped stops 67, formed as part of the drive wheel 66. The drive wheel 66 is configured to surround the lower part of the spindle body 50 so that the upper surface of the spring washer 64 contacts the clutch pad 62 and so that the lower surface of the drive wheel 66 is in direct contact with a second clutch pad 68. The drive wheel 66 may be either gear driven or friction driven. In this instance, the wheel 66 is friction driven, through an elastomer band 70 mounted on the periphery of the drive wheel 66. The elastomer band 70 is in contact with a pulley driven friction gear 72 attached to a rotating shaft 74 within a bushing 76 in the mounting platform 44.

A magnet 101 is press-fitted to the lower portion of the spindle body 50 and has its upper surface in contact with clutch pad 68. A spring 80 is located under the take-up reel spindle 24 so as to provide vertical biasing above the mounting platform 44 and thereby provide spacing between the rotating magnet 101 and the mounting platform 44. The magnet 101 is a multi-pole magnet, such as that shown in FIG. 4. Reed switch 102 is located adjacent the magnet 101 so as to be periodically switched opened and closed as the magnet 101 is rotated with the spindle body 50.

As can be seen by reference to FIGS. 1-5, the conventional tape deck provided no means whereby the phenomena of capstan tape windup could be detected. Referring to FIG. 5, it can further be seen that although the drive wheel 66 is driven only in the counterclockwise take-up direction by the driving mechanism 72, the spindle body 50 and the magnet 101 are solidly connected to each other and can be rotated in either the clockwise or counterclockwise directions. The spindle body 50 and the magnet 101 are rotated by either the clutch connected driving wheel 66 in the counterclockwise direction or are rotated by the tape being pulled from the take-up reel, by a force sufficient to overcome the friction forces of the slip clutches 62 and 68, in a clockwise direction. The circuit 100 is insensitive to capstan tape windup, since it senses any rotation of the magnet 101 as it continues to open and close the contacts of reed switch 102.

Simultaneous reference to FIGS. 6 and 7 is made in the following discussion in order to describe how the present invention is constructed, functions and overcomes the problems of the prior art.

As in the prior art, a friction drive connection supplies rotational driving forces to a spindle 24', of the present invention, via drive wheel 66. However, the spindle 24', of the present invention, is constructed, somewhat differently in that it comprises a three-piece spindle body 50' having an upper portion, a middle portion and a lower base portion press-fitted together to form an integral body. In addition, the spindle body 50' and the magnet 101' are in contact only through a third clutch pad 88. The clutch pad 88 rests on the upper horizontal surface of a spindle base 90 of the spindle body 50'.

The magnet 101' is a cup-shaped element having a central aperture 81 which loosely fits around the lower spindle body 53 and has an upper horizontal surface 83, in contact with clutch pad 68', and a recessed horizontal surface 85 in contact with clutch pad 88. Magnet 101' also contains a lower annular surface 84 which interacts with the textured surface 87 on a fixed plate 82 to provide a one-way clutch therebetween. The one-way clutch defined by surfaces 84 and 87 allows the magnet 101' to be rotated in a counterclockwise direction with low friction and prevents the magnet 101' from being rotated in the clockwise direction. A primary concern for the one-way clutch 84/87 was for vertical movement for the magnet to be minimal when the magnet was rotating in the counterclockwise direction and that such rotation did not cause noise. Accordingly, in the present embodiment, the surface 87 on the plate 82 is configured to have a series of sawtooth ratchet surfaces arranged in a circular pattern, such as is shown in FIG. 7, and the lower annular surface 84 of the magnet 101' has a thin felt pad adhesively connected thereto. The result is that the pad slips over the irregular surface 87 when the magnet is rotated in the counterclockwise direction and is gripped by the surface irregularities 87 to prevent the magnet 101' from turning in the clockwise direction.

An alternative construction of the one-way clutch would be in the form of a pawl configured to slide with respect to a ratcheted surface formed on the magnet 101' when it is rotated in the counterclockwise direction and to lockup and prevent rotation in the clockwise direction.

The portion of the upper surface of the plate 82 radially within the irregular surface 87 defines a smoother sliding surface 86. The surface of the spindle base 90 is also smooth and is generally biased above the surface 86 by spring 80. However, even if the two surfaces are contacted, they are smooth enough so that there is very little friction.

In operation, the drive mechanism causes the shaft 74 and the friction gear 72 to rotate in a clockwise direction. By contact through the elastomer 70, friction gear 72 causes the drive wheel 66 to rotate in the counterclockwise take-up direction. The take-up reel spindle body 50' is forced to rotate in the counterclockwise direction, along with the drive wheel 66, by the frictional forces of the clutch pad 62 compressed against the drive flange 60' by the spring washer 64. During this counterclockwise rotation, magnet 101' is also rotated in the counterclockwise direction by forces communicated through clutch pads 68' and 88. The rotation of the magnet 101' causes the reed switch 102 to be pulsated opened and closed and thereby cause the circuit 100 to continue to provide drive power for the driving mechanism.

When the spindle 24' is prevented from rotating in the counterclockwise direction due to the associated tape being at the end of the associated supply reel, the driving forces are continued to be communicated to the drive wheel 66, for a short time, causing the drive wheel 66 to turn and slip with respect to clutch pad 62. The continuing counterclockwise rotation of the drive wheel 66 tends to provide counterclockwise rotational forces to magnet 101' through clutch 68'. However, since clutch pad 88 between the upper surface of the spindle platform 90 and the recessed horizontal surface 85 covers a larger surface area than the clutch pad 68', the holding forces contributed by the spindle base 90 to the magnet 101' are greater than the rotational forces communicated through clutch 68'. Consequently, the magnet 101' is held stationary, along with the spindle 24'. Accordingly, with the magnet 101' stopped, the circuit 100 suspends driving power to the driving mechanism as described above.

If the phenomena of capstan tape windup occurs when the driving mechanism is engaged, the spindle 50' instantaneously changes direction from a counterclockwise take-up rotational direction to a clockwise rotation. At that time, the drive wheel 66 continues to rotate in the counterclockwise direction and the clutch 62 slips against the counteracting rotational forces, allowing the spindle body 50' to be rotated in the clockwise direction. As mentioned above with respect to clutch pads 68' and 88, clutch pad 88, between spindle platform 90 and magnet 101' dominates and tends to force the magnet 101' to rotate with the spindle body 50' in the clockwise direction. However, the one-way clutch, defined between surfaces 84 and 87, prevents clockwise rotation of the magnet 101' and causes magnet 101' to stop rotating and to slip against clutch 88. Therefore, the circuit 100, by responding to the stopped magnet 101', causes the drive power to be inhibited to turn off drive power to the spindle and the capstan in the event capstan tape windup starts to occur.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A tape deck including:
   means defining a mounting platform;
   a supply reel spindle and a take-up reel spindle on said platform means positioned for accepting respective supply and take-up reels;
   means connected to said platform means for driving said take-up reel spindle in a predetermined rotational direction;
   multipolar magnetic field producing means mounted between said take-up reel spindle and said platform means for rotating with said take-up reel spindle only when said spindle rotates in said predetermined rotational direction;
   one way clutch means between said platform means and said magnetic field producing means for allowing said field producing means to rotate only in said predetermined rotational direction and to prevent rotation of said field producing means in the opposite rotational direction; and
   means adjacent said magnetic field producing means for sensing the rotation thereof and providing an appropriate electrical signal output.

2. A tape deck as in claim 1, further including a first slip clutch between said driving means and said take-up reel spindle, wherein said driving means communicates rotational driving force of said predetermined direction to said take-up reel spindle via said first slip clutch.

3. A tape deck as in claim 2, further including a second slip clutch between said take-up reel spindle and said magnetic field producing means, wherein said take-up reel spindle communicates rotational driving forces to said magnetic field producing means via said second slip clutch.

4. A tape deck as in claim 3, further including a third slip clutch between said driving means and said magnetic field producing means, wherein said driving means communicates rotational driving forces to said magnetic field producing means via said third slip clutch;
   said second and third slip clutches are proportioned so that said second slip clutch provides dominant rotational driving forces to said magnetic field producing means in the event said take-up reel spindle is rotated in the opposite direction.

5. A tape deck as in claim 3, wherein said magnetic field producing means is a permanent magnet configured to have a surface opposed to a portion of the surface of said platform means; and said one way clutch means is defined between said opposed surfaces to allow said magnet to rotate with said take-up reel spindle in said predetermined rotational direction due to the rotational forces communicated through said second slip clutch and to prevent said magnet from rotating when said take-up reel spindle is rotated in the opposite direction.

6. A tape deck as in claim 5, further including a third slip clutch between said driving means and said magnetic field producing means, wherein said driving means also communicates rotational driving forces to said magnetic field producing means via said third slip clutch;
   said second and third slip clutches are proportioned so that said second slip clutch provides dominant rotational driving forces to said magnetic field producing means in the event said take-up reel spindle is rotated in the opposite direction.

* * * * *